(12) United States Patent
Nakajima

(10) Patent No.: US 8,032,883 B2
(45) Date of Patent: Oct. 4, 2011

(54) CONTROLLING ACCESS FROM THE VIRTUAL MACHINE TO A FILE

(75) Inventor: Hiroshi Nakajima, Nishitokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/763,056

(22) Filed: Apr. 19, 2010

(65) Prior Publication Data
US 2010/0275205 A1 Oct. 28, 2010

(30) Foreign Application Priority Data
Apr. 28, 2009 (JP) ................................ 2009-110092

(51) Int. Cl.
*G06F 9/455* (2006.01)
*G06F 15/16* (2006.01)
*G06F 15/173* (2006.01)
*G06F 9/00* (2006.01)

(52) U.S. Cl. ............ 718/1; 709/223; 709/224; 709/225; 709/229; 709/250; 713/1; 713/2

(58) Field of Classification Search ................ 718/1
See application file for complete search history.

(56) References Cited

U.S. PATENT DOCUMENTS

| | | | |
|---|---|---|---|
| 5,127,094 A * | 6/1992 | Bono | 711/2 |
| 7,246,174 B2 * | 7/2007 | Sciandra et al. | 709/244 |
| 7,506,170 B2 * | 3/2009 | Finnegan | 713/182 |
| 7,673,033 B2 | 3/2010 | Saigo et al. | |
| 2003/0217278 A1 | 11/2003 | Kimura et al. | |
| 2004/0167996 A1 | 8/2004 | Takamura et al. | |
| 2006/0146057 A1 | 7/2006 | Blythe | |
| 2007/0283169 A1 * | 12/2007 | Locker et al. | 713/193 |
| 2008/0307084 A1 | 12/2008 | Saigo et al. | |
| 2009/0217265 A1 * | 8/2009 | Ishikawa | 718/1 |
| 2009/0276774 A1 * | 11/2009 | Kinoshita | 718/1 |
| 2010/0058340 A1 * | 3/2010 | Kamada | 718/1 |

FOREIGN PATENT DOCUMENTS

| | | |
|---|---|---|
| JP | 2003-337736 | 11/2003 |
| JP | 2004-258840 | 9/2004 |
| JP | 2006-190281 | 7/2006 |

(Continued)

OTHER PUBLICATIONS

Japanese Patent Application No. 2009-110092, Notice of Reasons for Rejection, mailed Aug. 31, 2010. (English Translation).

*Primary Examiner* — Jennifer To
(74) *Attorney, Agent, or Firm* — Blakely, Sokoloff, Taylor & Zafman LLP

(57) ABSTRACT

According to one embodiment, a computer machine includes a client virtual machine and a file server virtual machine configured to simultaneously run, a virtual machine manager configured to control booting of the client and file server virtual machines, a monitoring module configured to monitor whether a communication with an external file server is possible, an access control module configured to access to a duplicate file which is a duplicate of the file and is stored in a part of a local disk or a part of a memory which are managed by the monitoring module when the monitoring module determines that the communication is impossible after determining that the communication is possible, and a file deletion module configured to delete the duplicate file when the monitoring module detects the communication is impossible in a preset time.

5 Claims, 17 Drawing Sheets

FOREIGN PATENT DOCUMENTS

| | | |
|---|---|---|
| JP | 2006-215650 | 8/2006 |
| JP | 2006-309395 | 11/2006 |
| JP | 2007-233989 | 9/2007 |
| JP | 2007-316789 | 12/2007 |
| JP | 2008-305287 | 12/2008 |
| WO | WO 2006118122 | 11/2006 |

* cited by examiner

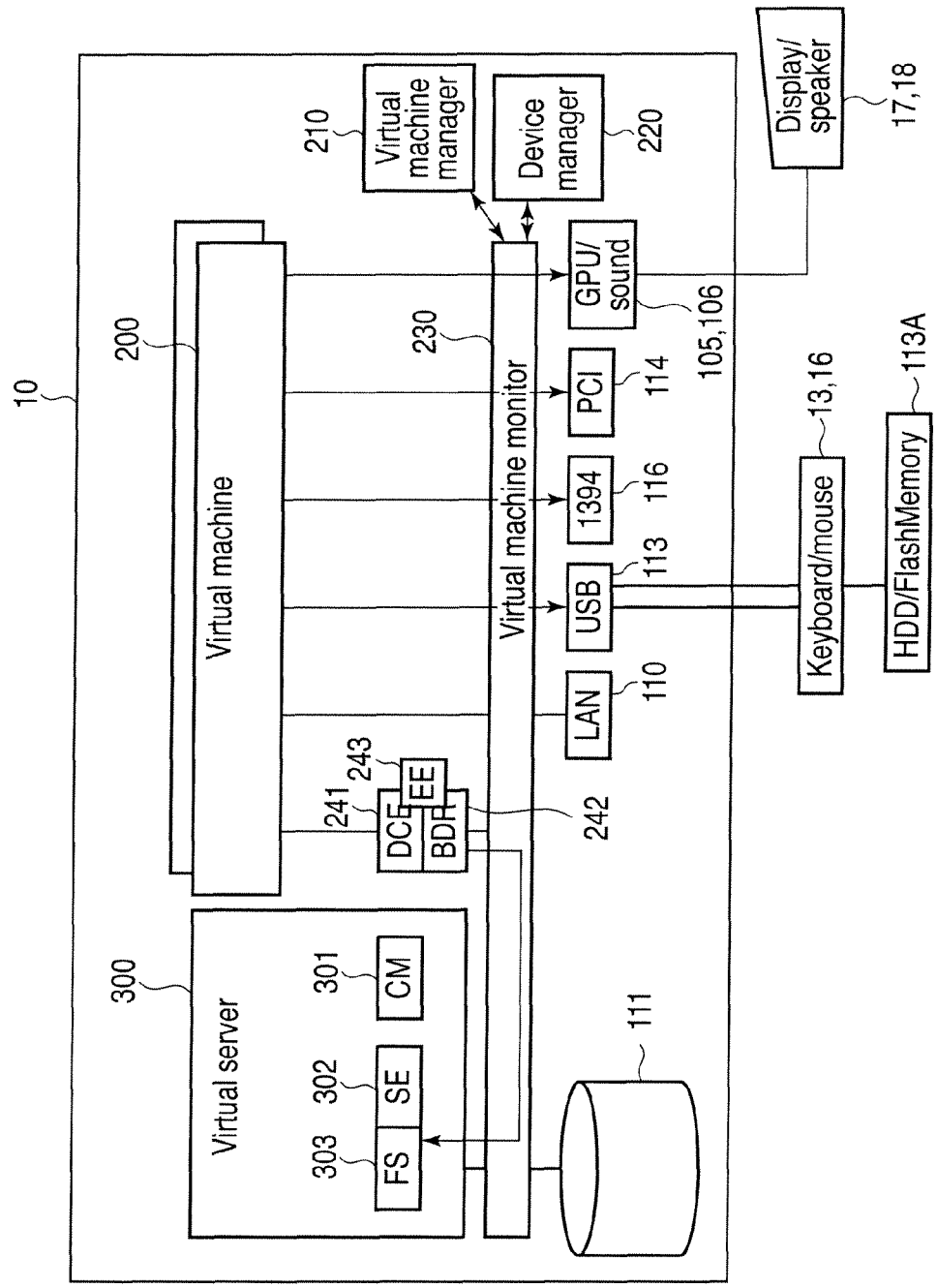
F I G. 1

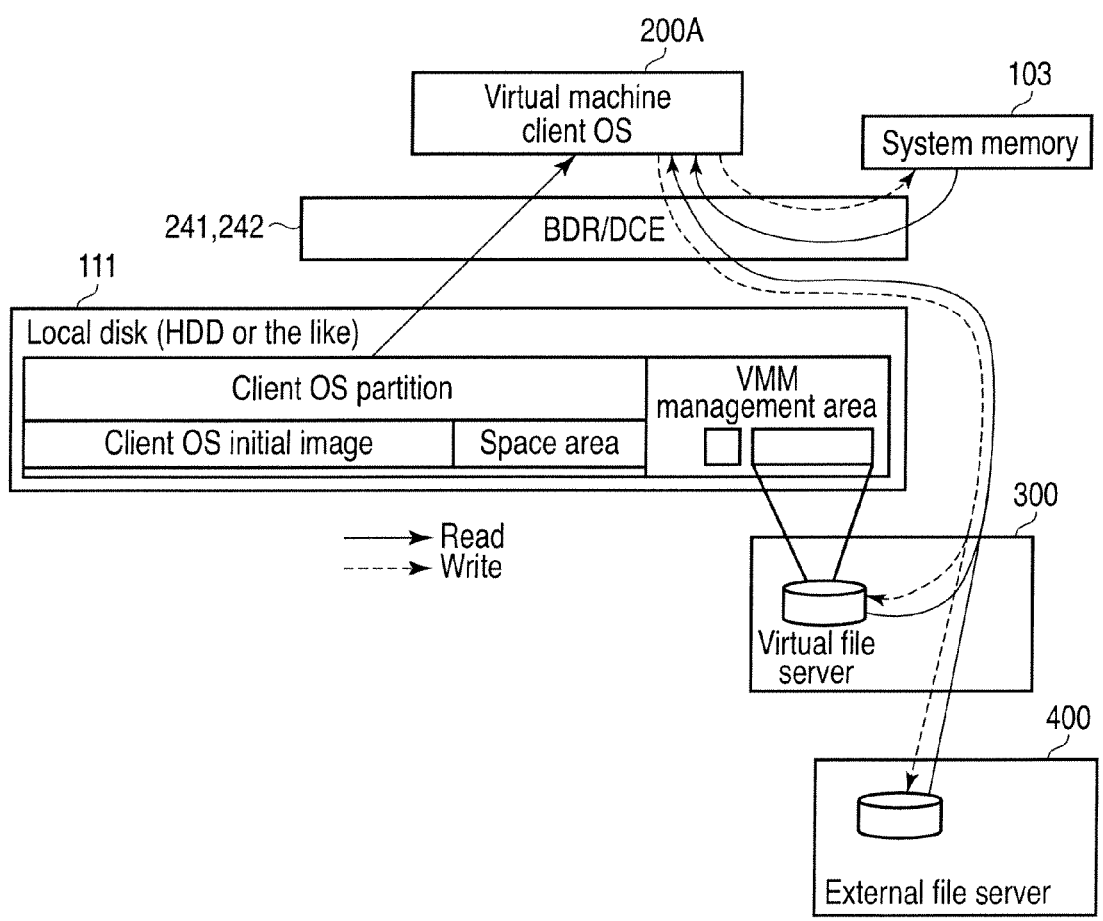
F I G. 2

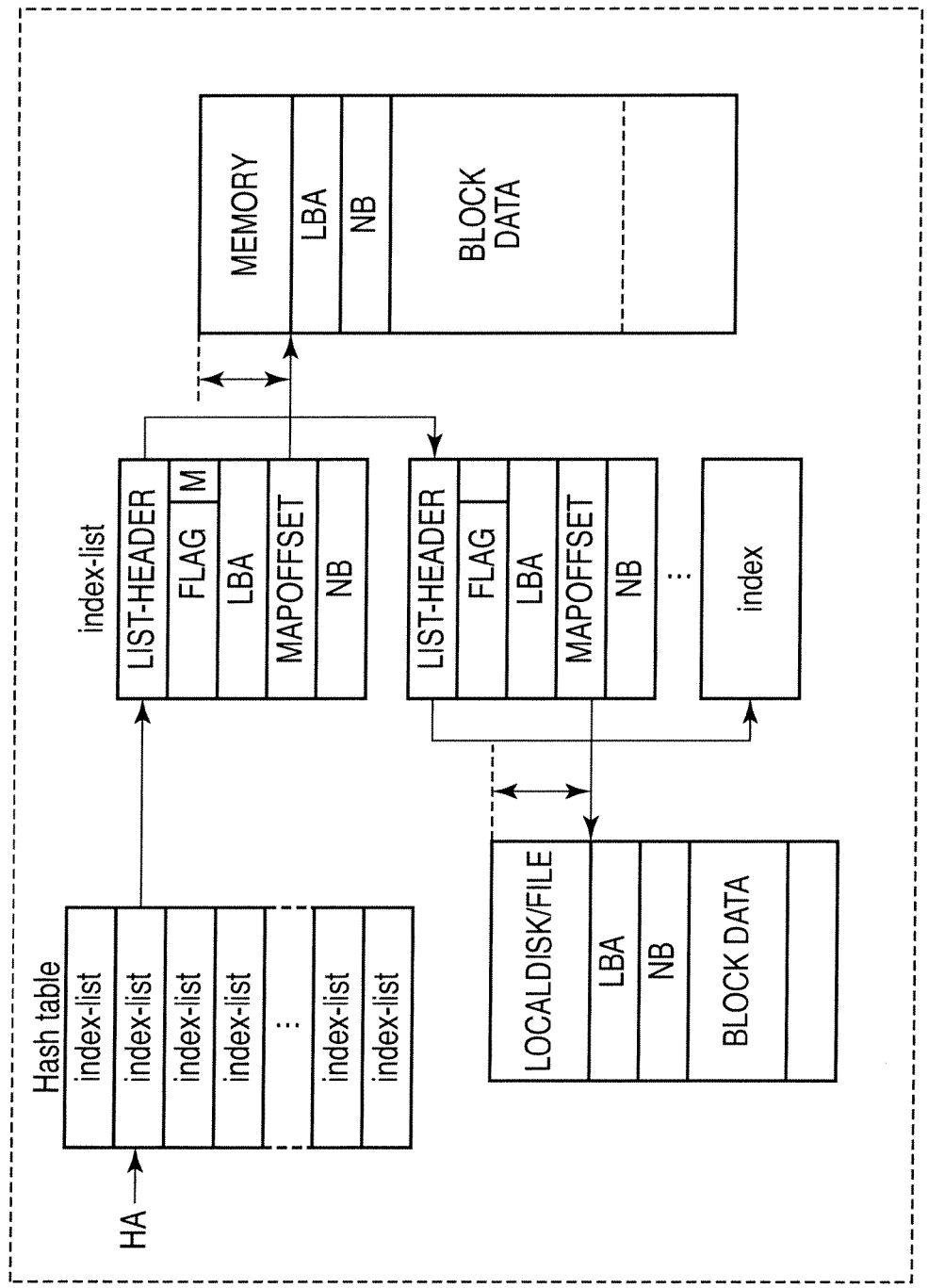
F I G. 6

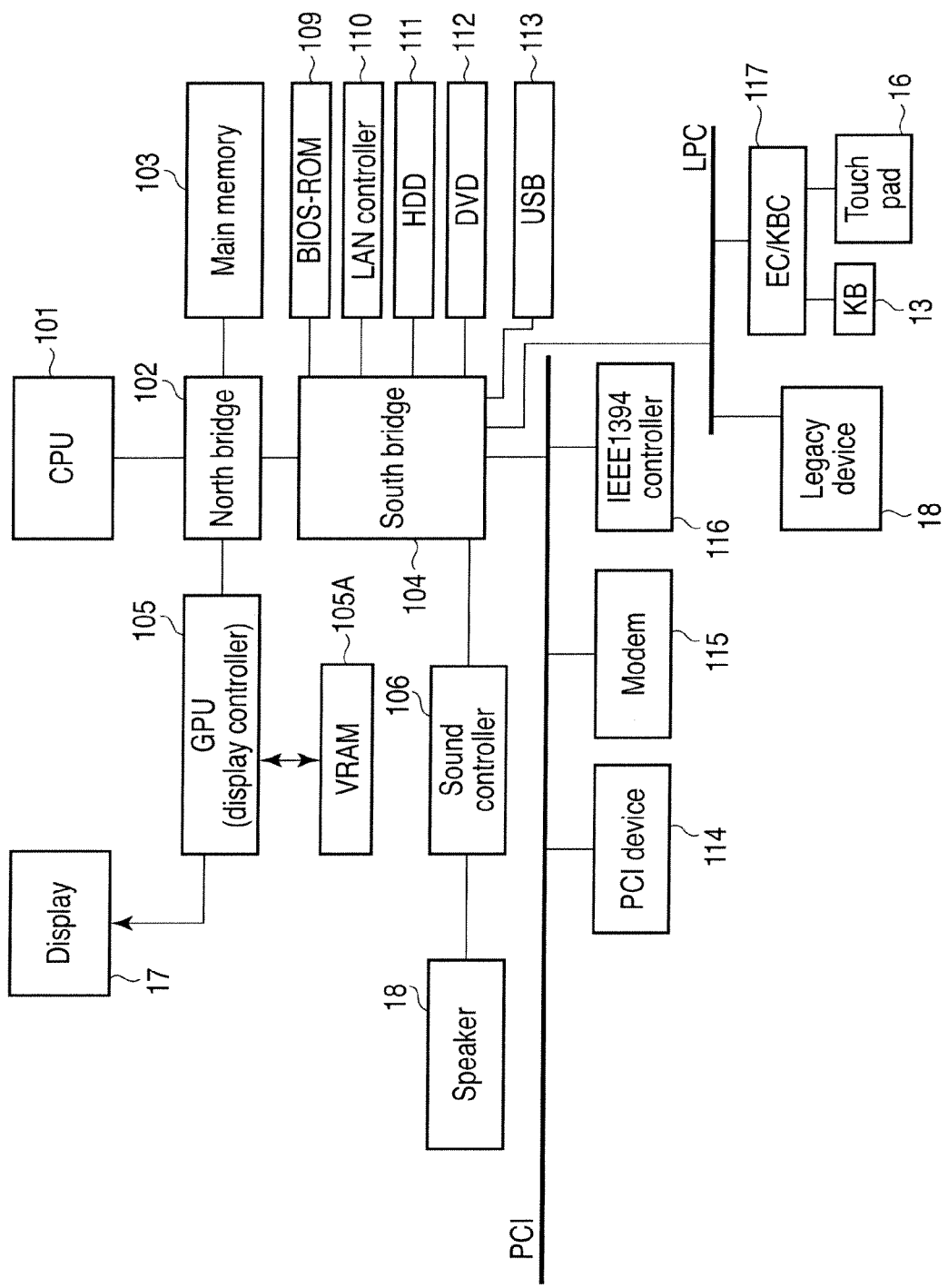
F I G. 7

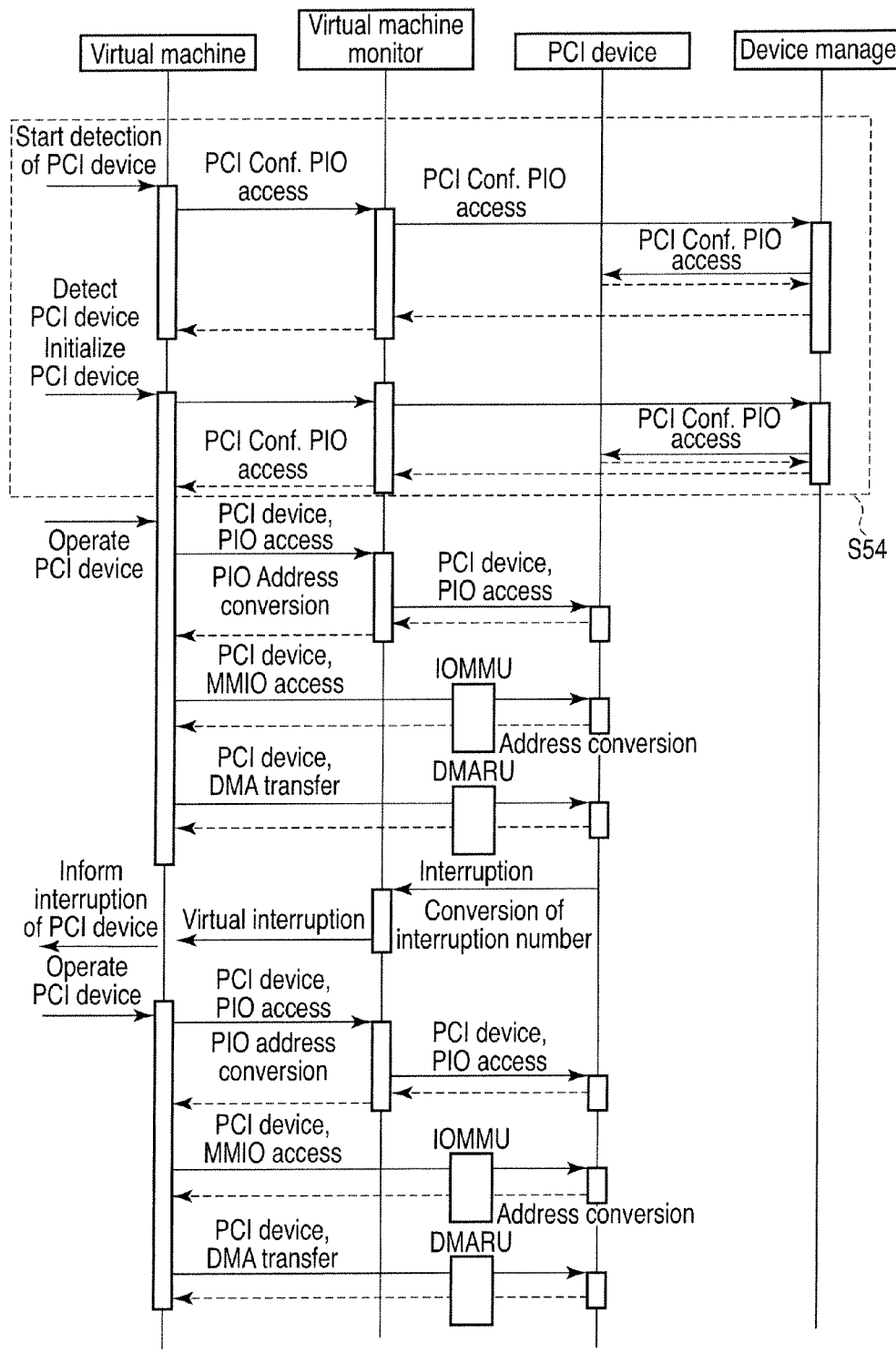
F I G. 12

| | | |
|---|---|---|
| UserName | UserA | User name |
| AssertDevice | - | Valid device |
| NumAssertDevice | 7 | Valid device number |
| DeviceName | VGA Controller | Device name |
| DeviceType | VGA | Device type |
| DevicePort | 1 | Device port |
| DeviceName | Audio Controller | |
| DeviceType | AUDIO | |
| DevicePort | 1 | |
| DeviceName | USB Controller | |
| DeviceType | USB | |
| DevicePort | ALL | |
| DeviceName | IEEE1394 Controller | |
| DeviceType | 1394 | |
| DevicePort | 1 | |
| DeviceName | PC Card Controller | |
| DeviceType | PCCARD | |
| DevicePort | 1 | |
| DeviceName | SD Card Controller | |
| DeviceType | SD Card | |
| DevicePort | 1 | |
| DeviceName | Keyboard/Mounse Controller | |
| DeviceType | KEYBOARD_MOUSE | |
| DevicePort | 1 | |

FIG. 13

| | | |
|---|---|---|
| UserName | UserA | User name |
| AssertDevice | - | Valid device |
| NumAssertDevice | 5 | Valid device number |
| DeviceName | USB Controller | Device name |
| DeviceType | USB | Device type |
| DevicePort | 1 | Device port |
| PCI_BusNum | 0 | PCI device BUS number |
| PCI_DeviceNum | 30 | PCI device Device number |
| PCI_FunctionNum | 0 | PCI device Function number |
| BaseAddress1 | C020 | I/O port base address 1 |
| BaseAddressType1 | PIO | Address type 1 |
| VirtualBaseAddress1 | C020 | Virtual I/O port base address 1 |
| BaseAddress2 | | |
| BaseAddressType2 | | |
| VirtualBaseAddress2 | | |
| BaseAddress3 | | |
| BaseAddressType3 | | |
| VirtualBaseAddress3 | | |
| BaseAddress4 | | |
| BaseAddressType4 | | |
| VirtualBaseAddress4 | | |
| BaseAddress5 | | |
| BaseAddressType5 | | |
| VirtualBaseAddress5 | | |
| BaseAddress6 | | |
| BaseAddressType6 | | |
| VirtualBaseAddress6 | | |
| IRQ | 17 | Interruption number |
| VIRQ | 20 | Virtual interruption number |

FIG. 14

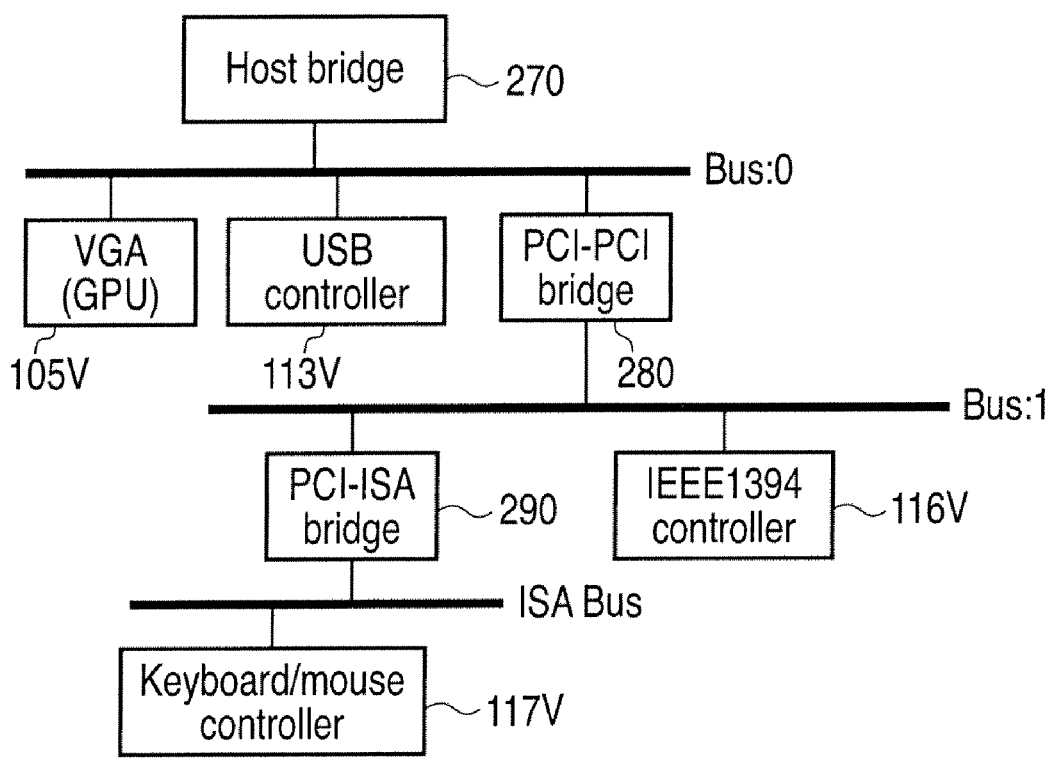
F I G. 15

CONTROLLING ACCESS FROM THE VIRTUAL MACHINE TO A FILE

CROSS-REFERENCE TO RELATED APPLICATIONS

This application is based upon and claims the benefit of priority from Japanese Patent Application No. 2009-110092, filed Apr. 28, 2009, the entire contents of which are incorporated herein by reference.

BACKGROUND

1. Field

One embodiment of the invention relates to a computer having a plurality of virtual machines operated on a virtual machine monitor and a control method of access from the virtual machine to a file.

2. Description of the Related Art

There is always a possibility that a computer installed in an office may be stolen and secret information of a company leaked.

It is disclosed in Jpn. Pat. Appln. KOKAI Publication No. 2003-337736 that two OSs are installed on one computer, one OS is used as an application OS, the other OS is used an OS which performs a communication process with a commonly used hard disk device and access from the application to the commonly used disk device is made via the second OS without fail.

The above-described document discloses a technique for preventing bugging of data flowing on the network. However, it is impossible to cope with leakage of secret information if a computer having the secret information stored therein is carried out.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is a block diagram showing the configuration of a client computer as a computer according to one embodiment of this invention;

FIG. 2 is a diagram for illustrating relocation of block data according to the embodiment of this invention;

FIG. 6 is a diagram showing the data structure managed by the block data remapping unit;

FIG. 7 is a block diagram showing the system configuration of the client computer shown in FIG. 1;

FIG. 12 is a flowchart for illustrating the operation flow from booting of the client computer to execution of the virtual machine;

FIG. 13 is a diagram showing an example of a device profile;

FIG. 14 is a diagram showing an example of a device model configuration list;

FIG. 15 is a diagram showing an example of the configuration of a virtual device model;

DETAILED DESCRIPTION

Figure 3:
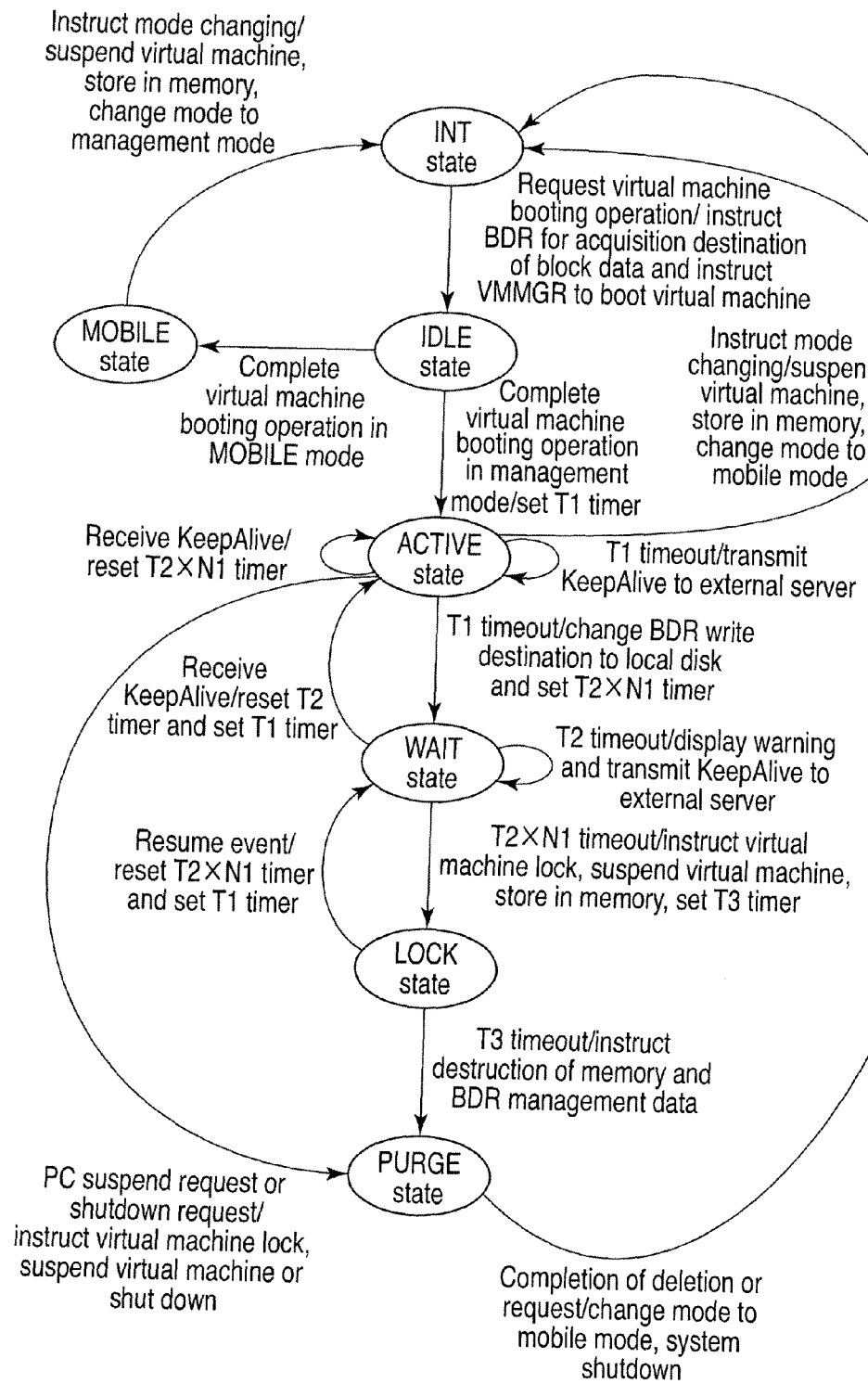
FIG. 3 is a diagram for illustrating the operation of a supervisor monitor shown in FIG. 1.

Various embodiments according to the invention will be described hereinafter with reference to the accompanying drawings. In general, according to one embodiment of the invention, a computer machine comprises a local disk, a memory, a virtual machine monitor configured to run in the computer machine, virtual machines configured to simultaneously run on the virtual machine monitor and comprising a client virtual machine and a file server virtual machine in which an internal file server accessible from the client virtual machine is executed, a virtual machine manager configured to manage a part of the local disk and a part of the memory and to control booting of the virtual machines, a monitoring module configured to monitor whether a communication with an external server in which an external file server is executed via a network is possible, an access control module configured to access to a file stored in the external file server or the internal file server when the client virtual machine tries to accesses the file and the monitoring module determines that the communication is possible, and to access to a duplicate file which is a duplicate of the file and is stored in the part of the local disk or the part of the memory when the client virtual machine tries to access to the file and the monitoring module determines that the communication is impossible after determining that the communication is possible, and a file deletion module configured to delete the duplicate file when the monitoring module detects the communication is impossible in a preset time.

An embodiment of this invention will be explained below with reference to the accompanying drawings.

FIG. 1 is a block diagram showing a client computer used as a computer according to one embodiment of this invention.

As shown in FIG. 1, a computer 10 comprises a virtual machine monitor (hypervisor) 230, virtual machine manager 210, device manager 220, virtual machine 200, disk controller emulator (DCE) 241, block data remapping (BDR) unit 242, encryption engine (EE) 243, virtual server 300, LAN controller 110, USB controller 113, IEEE1394 controller 116, PCI device 114, graphics processor unit (GPU) 105/sound controller 106, hard disk drive 111 and the like.

The virtual machine monitor 230 manages hardware devices such as the LAN controller 110, USB controller 113, IEEE1394 controller 116, PCI device 114 and graphics processor unit (GPU) 105/sound controller 106 and allocates resources to the virtual machine 200 and virtual server 300 that are operated on the virtual machine monitor 230. Further, the virtual machine monitor 230 distributes execution schedules of the virtual machine 200 and virtual server 300 and I/O requests from the virtual machine to the hardware devices.

The virtual machine manager 210 controls the booting operations of the virtual machine 200 and virtual server 300 that are operated on the virtual machine monitor 230. The device manager 220 manages the hardware devices before the virtual machine 200 and virtual server 300 are booted. Further, the device manager also controls communication with the I/O device after the virtual machine 200 and virtual server 300 were booted. The virtual machine manager 210 is referred to by the virtual machine to issue an instruction of initial load start of an operating system and perform an ACPI (power source management and I/O control) operation.

The virtual machine monitor 230, virtual machine manager 210, device manager 220, virtual machine 200 and virtual server 300 are software modules operated on the processor.

The LAN controller 110 is a network interface used to connect the present computer to a LAN (Local Area Network). The USB controller 113 is a controller that controls communications with USB devices such as a keyboard 13, touch pad 16 and HDD/flash memory 113A connected to a USB bus. The IEEE1394 controller 116 is a controller that controls communication with an external device connected to an IEEE1394 bus. The PCI device 114 is a device connected to a PCI bus. The GPU 105 is a display controller that controls a display. The GPU 105 comprises a video memory (VRAM) and generates a video signal used to form a display image to be displayed on the display based on display data drawn in the video memory according to an OS/application program. The sound controller 106 is a sound source device and outputs to-be-reproduced audio data to a speaker.

In the HDD 111, an install image used to execute an application, driver and operating system is stored when the computer 10 is provided to the user. Generally, the computer 10 is used by executing the driver and application after the operating system is booted by means of the install image (non-virtual machine mode). When the computer 10 is used in a virtual environment, the install image is executed as a virtual machine and another service OS is simultaneously executed on a background (virtual machine mode). A mode changing operation is performed by the virtual machine manager 210. The virtual machine manager 210 asks the user about one of the modes to be used at the booting and boots the system in one of the virtual machine mode and non-virtual machine mode according to an instruction of the user.

When the operation is performed in the virtual machine mode, a virtual machine monitor (hypervisor) that controls the virtual machine and H/W, a device manager that allocates resources of the device I/O to the virtual machine and a loader that loads the install image of the virtual machine are operated.

The disk control emulator 241 is a software module that emulates the disk controller. The virtual machine 200 and virtual server 300 recognize a disk controlled by the disk control emulator 241 and it is used as a virtual HDD. The disk control emulator 241 is a virtual disk controller that emulates a standard controller that is in conformity to a standard such as IDE (Integrated Drive Electronics) or AHCI (Advance Host Controller Interface) according to software and partly causes a hardware device to perform a DMA transfer operation. Data to be read from or written in the virtual disk is used to transfer information of to-be-written data to the block data remapping unit 242 via the disk control emulator 241. In the block data remapping unit 242, an actual data holding location is relocated in a system memory or local disk or a file of an external server.

The data relocation is explained with reference to FIG. 2. Block data to be relocated is relocated in another location when a write instruction is issued from a client virtual machine 200A, which is one of the virtual machines 200, in which a client OS such as Windows® is operated. If a read instruction is issued, the block data remapping unit 242 checks whether the same block data that is previously written is present or not. If the data is not present, an instruction is issued to read data from an original disk. As a result, data is not written into the original install image, only block data whose write location is changed is relocated by the block data remapping unit 242 and stored in a file on the memory 103 or local disk 111 or in an external file server 400 and a different portion with respect to the original install image is stored in each location. The encryption engine (EE) 243 encrypts the block data.

As shown in FIG. 1, a supervisor monitor (CM) 301, search engine (SE) 302 and file server (FS) 303 are operated in the virtual server 300.

The supervisor monitor 301 is a software module that controls relocation of a file.

The search engine 302 can refer to a file in an install image of the client virtual machine 200A to research for the file in the install image of the virtual machine. The search engine 302 stops boot of the client virtual machine 200A or displays a warning if data of a specified pattern and file name is present while the client virtual machine 200A is interrupted or suspended.

Further, the file server 303 manages a file in the local disk.

Next, the operation of the supervisor monitor 301 is explained with reference to FIG. 3.

In the initial (INIT) state, the client virtual machine 200A is not booted and the virtual server 300 is booted. The supervisor monitor 301 operated in the virtual server 300 in the initial state gives an instruction of an acquisition destination of block data to the block data remapping unit 242. The operation mode setting of the acquisition destination of block data that indicates an operation mode at the previous shutdown time is recorded in the virtual server 300. Therefore, the supervisor monitor 301 refers to the operation mode setting to give an instruction of an acquisition destination of block data to the block data remapping unit 242. Further, the supervisor monitor 301 gives an instruction to the virtual machine manager 210 to boot the client virtual machine 200A in a mode based on the operation mode.

The operation mode of the client virtual machine 200A includes a management mode in which the machine is connected to an external server of a company or house (irrespective of wire or wireless) and a mobile (MOBILE) mode in which the machine is separated from the external server. The supervisor monitor 301 gives an instruction of storage locations of block data (a different portion with respect to data in the local disk) corresponding to the respective operation modes to the block data remapping unit 242.

In the management mode, the machine is booted by use of system data having a reference destination of user data set in the external file server. In the mobile mode, the machine is booted by use of system data in which a reference destination of a file required for booting the client virtual machine 200A in the user data is set in the virtual server and a file permitted (authenticated) by an administrator is stored in the internal file server.

While the virtual machine manager 210 is booting the client virtual machine 200A, the supervisor monitor 301 waits in an idle (IDLE) state. If booting of the client virtual machine 200A is completed, the supervisor monitor 301 is shifted to a state (mobile state or active (ACTIVE) state) corresponding to the set operation mode.

If the set operation is a management mode, the supervisor monitor 301 is shifted to the active state. In the active state, the supervisor monitor 301 sets a timer that is timed out at time T1.

In the active state, the supervisor monitor 301 periodically transmits and receives KeepAlive with respect to the external file server. If a response from the external file server is not present during a certain period of time T1, the supervisor monitor 301 is shifted to a wait (WAIT) state.

In the case of the wait state, the supervisor monitor 301 changes, via the block data remapping unit 242, a write destination to a local disk based on the fact that temporary communication with the external server is not possible. Further, a timer that is timed out at time T2×N1 and informs the supervisor monitor 301 of elapsed time for each time T2 is set.

If a response from the external server is provided in the wait state, the supervisor monitor 301 resets the timer that is timed out at time T2×N1 and is shifted to an active state.

The machine can be used without interrupting the operation of the computer 10 in the wait state. In this case, however, a warning is displayed on the user interface on the client virtual machine 200A for each set time T2 or a warning is displayed by flashing an LED provided on the computer 10.

When a response is not issued from the external server even if the warning is issued and time T2×N1 has elapsed after the response of the external file server was finally received, the supervisor monitor 301 instructs the virtual machine monitor 230 to lock the client virtual machine 200A. The virtual machine monitor 230 temporarily interrupts the CPU scheduling, memory allocating and I/O controlling operations and requests suspend (SuspendtoRAM) with respect to the client virtual machine 200A. Further, the supervisor monitor 301 sets a timer that is timed out at time T3.

The supervisor monitor 301 is shifted to a lock (LOCK) state. In the lock state, the power source of the whole portion of the system is set in an on state and the virtual machine monitor 230 and virtual server 300 are operated. In this case, the client virtual machine 200A is set in the rest state and the memory content used by the client virtual machine 200A is stored in an area of the local disk that is managed by the virtual machine monitor 230.

If the user issues a request of a resume process of the computer in the lock state, the client virtual machine 200A loads the memory content previously stored to resume the client virtual machine 200A. Then, the supervisor monitor 301 is set back to the wait state. Further, when it returns to the wait state, the supervisor monitor 301 resets the timer that is timed out at time T2×N1 and sets the timer that is timed out at time T1.

If the state is not set from the lock state that is a suspended state to the active state and when time T3 has elapsed, the supervisor monitor 301 instructs the block data remapping unit 242 to delete the memory content previously stored in the local disk and block data stored in the block data remapping unit 242. While the block data remapping unit 242 is deleting the memory content and block data, the supervisor monitor 301 is set to a purge (PURGE) state. When the block data remapping unit 242 has deleted the memory content and block data, the supervisor monitor 301 records boot mode setting indicating that the client virtual machine 200A is to be booted in the mobile mode at the next booting time in the supervisor monitor 301, shuts down the whole portion of the system and is shifted to an initial (INIT) state.

Further, if the user issues a request of a shutdown process or a suspend process of the computer from the active state, the supervisor monitor 301 instructs the virtual machine monitor 230 to lock the client virtual machine 200A. Then, the virtual machine monitor 230 temporarily interrupts the CPU scheduling, memory allocating and I/O controlling operations and requests suspend (SuspendtoRAM) with respect to the client virtual machine 200A. Further, the supervisor monitor 301 requests the virtual machine manager 210 to suspend or shut down the client virtual machine 200A.

By the above process, communication of the supervisor monitor 301 with the external server is interrupted for a preset time and the supervisor monitor determines that it is carried out without changing the mode when it is determined that it is separated from the LAN of a company or the like. Then, the supervisor monitor 301 is set to a purge (PURGE) state and is set into a mobile mode. At this time, a file, and data used and data on the memory are deleted from the local disk to prevent data from being carried out to the exterior.

In a case where the computer 10 set in the mobile state is connected to the LAN to acquire preset data, it is impossible to refer to data of the external server and data used so far in the management mode if the mode is not changed to the management mode. It is impossible to insert data acquired in the mobile mode, downloaded files or the like into data managed in the management mode without approval.

Figure 4:
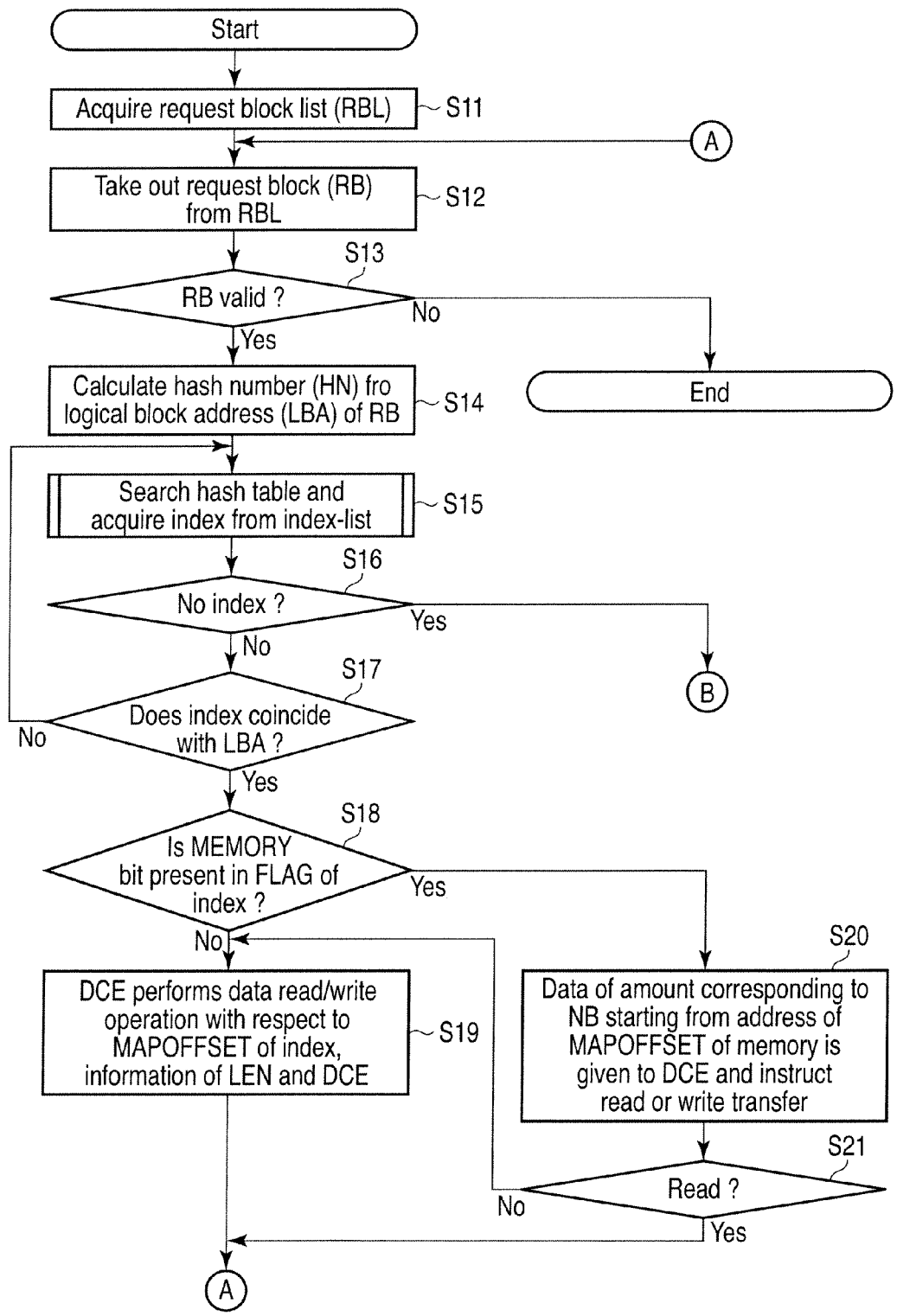
FIG. 4 is a diagram for illustrating the basic operation of a block data remapping unit shown in FIG. 1.
Figure 5:
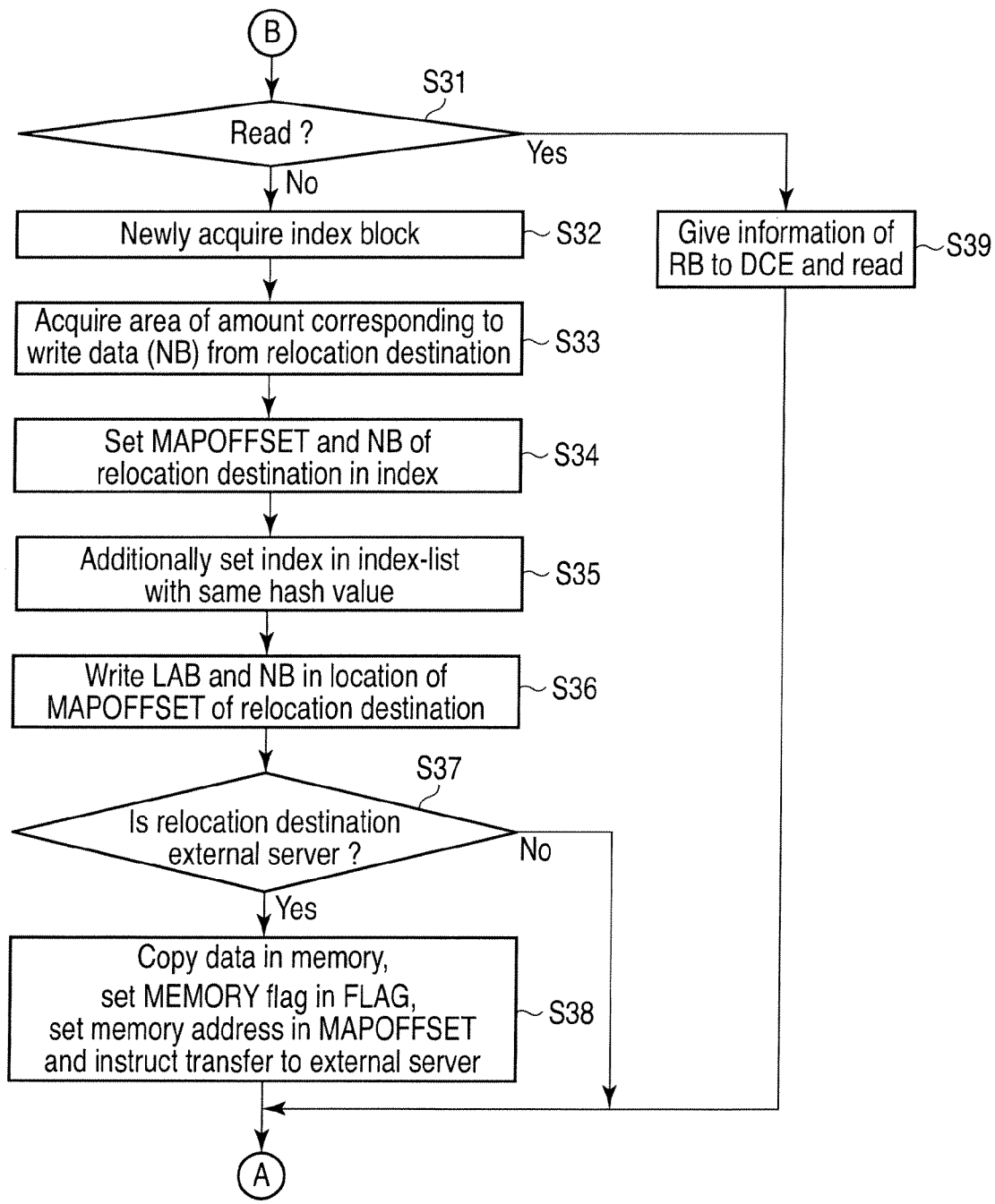
FIG. 5 is a diagram for illustrating the basic operation of the block data remapping unit shown in FIG. 1.

Next, the basic operation of the block data remapping unit 242 in the active state and wait state is explained with reference to FIGS. 4 and 5. Further, the data structure managed by the block data remapping unit 242 is explained with reference to FIG. 6.

The read/write request to the virtual machine 200 is given in the form of a request block list (RBL). The request block list is configured by a list comprising a plurality of request blocks (RB), a request block being a structure comprising a logical block address LBA (Logical Block Addressing), request block number RBN and read/write attribute. The request block list is given from the disk control emulator 241 to the block data remapping unit 242 and thus the block data remapping unit 242 acquires the request block list (block S11).

The block data remapping unit 242 takes out request blocks one by one from the request block list (block S12) and checks whether the request block is valid or not (block S13). If it is determined that the request block is invalid or is not provided (No in block S13), the process of the block data remapping unit 242 is terminated as it is.

If the request block is valid (Yes in block S13), the block data remapping unit 242 extracts the LEA from the extracted request block and calculates a hash value HA (block S14). A pointer to an index list (index-list) is provided in a hash table. The block data remapping unit 242 refers to a pointer based on the hash value HA to extract the index list (block S15). If no index is present in the index list (Yes in block S16), the block data remapping unit 242 determines whether a request from the client virtual machine 200A is a read request or not (block S31). If the request is a read request (Yes in block S31), the disk control emulator 241 sends the content of the request block back to the disk control emulator 241 and performs a read process from the local disk (block S39).

If the request is not a read request (in the case of a write request) (No in block S31), an index block is newly acquired (block S32) and an area of a write data amount corresponding to the block number NB is acquired (block S33). The write block number NB and MAPOFFSET in the thus acquired location are set in the index block. The index block is additionally provided in the index list having the same hash value (block S35). Then, the block data remapping unit 242 instructs writing of data into the relocation destination (block S36). Next, the block data remapping unit 242 determines whether the relocation destination is an external server or not (block S37). If the relocation destination is an external server (Yes in block S37), the block data remapping unit 242 makes a MEMORY flag in the index valid and instructs transfer of the same to the external server.

If the index is present (No in block S16), the block data remapping unit 242 determines whether the index coincides with an LBA contained in the index block (S17). In the case of non-coincidence (No in block S17), the block data remapping unit 242 extracts a subsequent index block from the index list (block S15) and searches for an index that coincides with the LBA again. If the index that coincides with the LBA is provided, the block data remapping unit 242 determines whether or not a MEMORY flag present in the index is valid (block S18). If the flag is valid (Yes in block S18), the block data remapping unit 242 gives the block number (NB) and offset address (MAPOFFSET) in which data on the memory is present to the disk control emulator 241 in order to perform the read/write operation with respect to the memory, and then the disk control emulator 241 performs the read/write operation (block S20). At this time, if a read request is provided, a subsequent request block is processed. Then, the block data remapping unit 242 determines whether or not a request from the client virtual machine 200A is a read request (block S21). If the request is not a read request (No in block S21) or if the MEMORY flag is not valid (No in block S18), the block data remapping unit 242 gives the LBA and NB in the index to the disk control emulator 241. The disk control emulator 241 performs the read/write operation with respect to the local disk based on the LBA and NB (block S19).

As described above, a connection with the external server is periodically checked by means of the supervisor monitor. If no response is provided, leakage of secret information can be prevented even if the computer is carried out without leaving data in the local disk by performing lock and purge operations irrespective of the operation of the client OS. Further, it is possible to cope with a case wherein the user forgets to change the modes.

(System Configuration)

Next, the system configuration of the computer is explained with reference to FIG. 7.

As shown in FIG. 7, the present computer comprises a CPU 101, north bridge 102, main memory 103, south bridge 104, graphics processing unit (GPU) 105, video memory (VRAM) 105A, sound controller 106, BIOS-ROM 109, LAN controller 110, hard disk drive (HDD) 111, DVD drive 112, PCI device 114, modem 115, IEEE1394 controller 116, embedded controller/keyboard controller IC (EC/KBC) 117 and the like.

The CPU 101 is a processor that controls the operation of the computer 10 and executes various application programs loaded from the hard disk drive (HDD) 111 to the main memory 103. Further, the CPU 101 also executes a system BIOS (Basic Input Output System) stored in the BIOS-ROM 109. The BIOS is a program used for hardware control.

The north bridge 102 is a bridge device that connects the local bus of the CPU 101 with the south bridge 104. In the north bridge 102, a memory controller that controls access to the main memory 103 is contained. Further, the north bridge 102 has a function of making communication with the GPU 105 via a serial bus of a PCI EXPRESS standard, for example.

The GPU 105 is a display controller that controls a display 17 used as a display monitor of the computer 10. A display signal generated by the GPU 105 is supplied to the display 17.

The south bridge 104 controls devices each comprising a legacy device 18 on an LPC (Low Pin Count) bus and devices each provided on a PCI (Peripheral Component Interconnect) bus. Further, the south bridge 104 contains an IDE (Integrated Drive Electronics) controller that controls the hard disk drive (HDD) 111 and DVD drive 112. Also, the south bridge 104 has a function of making communication with the sound controller 106.

The sound controller 106 is a sound source device and outputs to-be-reproduced audio data to a speaker 18. The USB controller 113 makes communication with an external device via a serial bus of a USB standard. The IEEE1394 controller 116 makes communication with an external device via a serial bus of an IEEE1394 standard. The modem 115 is a signal converter that makes data communication via an analog circuit such as a telephone line.

The embedded controller/keyboard controller IC (EC/KBC) 117 is a one-chip microcomputer in which an embedded controller for power management and a keyboard controller used to control the keyboard (KB) 13 and touch pad 16 are integrated. The embedded controller/keyboard controller IC (EC/KBC) 117 has a function of turning on or off the power source of the computer 10 in response to the operation of a power button 14 by the user. Further, the embedded controller/keyboard controller IC (EC/KBC) 117 has a function of making communication with a remote control unit interface 20.

Among the above devices, the GPU 105, LAN controller 110, IDE controller to which the HDD 111 and DVD are connected, USB controller 113, IEEE1394 controller 116, modem 115 and other PCI devices 114 are connected as PCI devices. The CPU 101 makes access to the above devices according to the PCI standard and is operated.

The computer is a device that supports a direct I/O technology (VT-d) of Intel (registered trademark). VT-d is a technique for expressing the I/O device in a virtual form. Particularly, VT-d plays a role of parts of the chip set, I/O controller and memory controller.

Several methods are provided to express the I/O device in a virtual form, but in this device that supports the VT-d, the I/O device is expressed in a virtual form by use of a pass-through model. In the pass-through model, the virtual machine monitor can directly allocate the I/O device to the virtual machine. For example, an exclusive-use SCSI card or network card is prepared for each virtual machine and is allocated to each virtual machine in one-to-one correspondence. Further, the device manager performs an initialization control process of the PCI device.

Next, booting of the virtual machine and allocation of the I/O device are explained.

Figure 8:
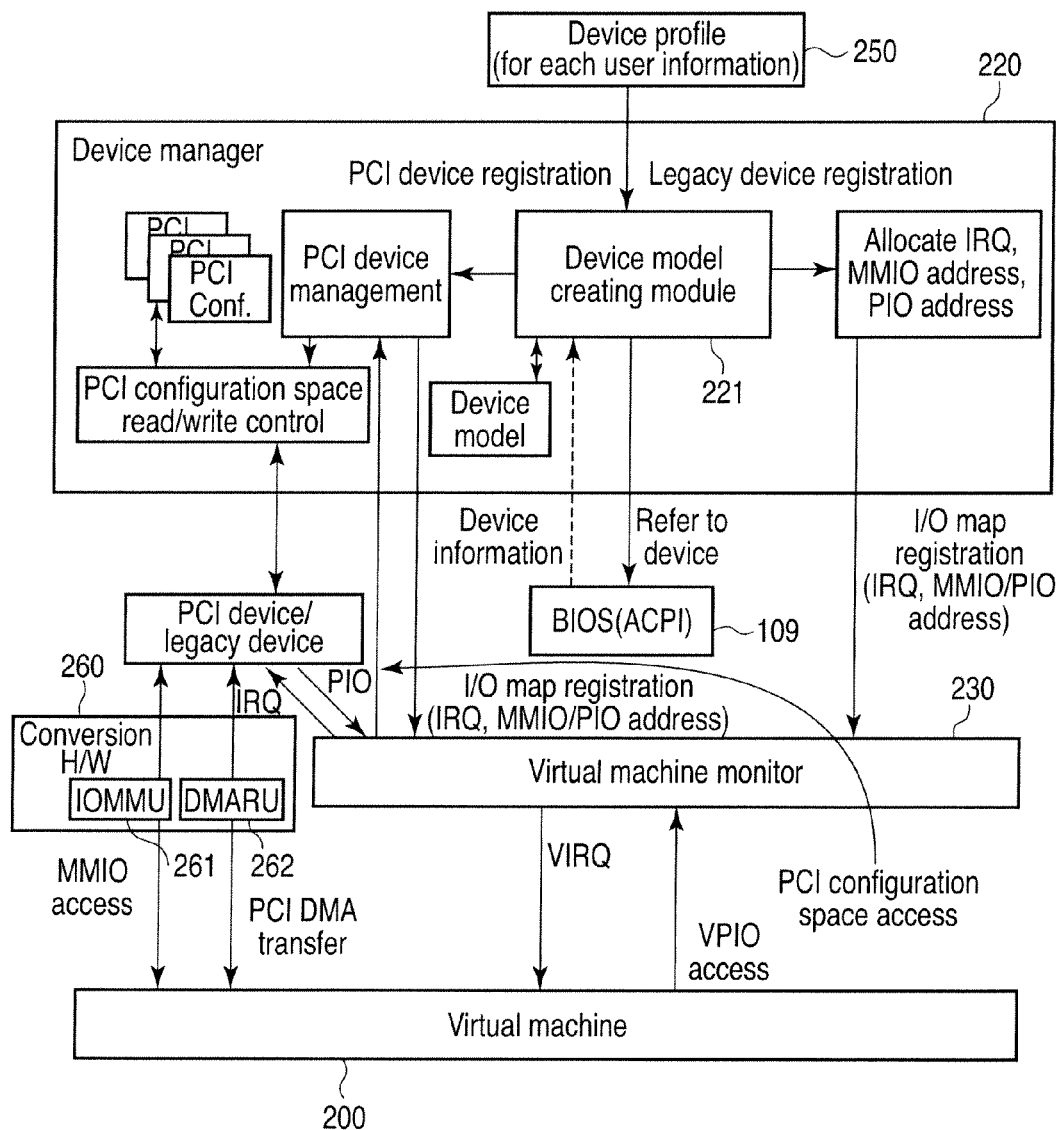
FIG. 8 is a block diagram showing the configuration of a device manager that manages a device and the relationship thereof with a virtual machine and virtual machine monitor.
Figure 9:
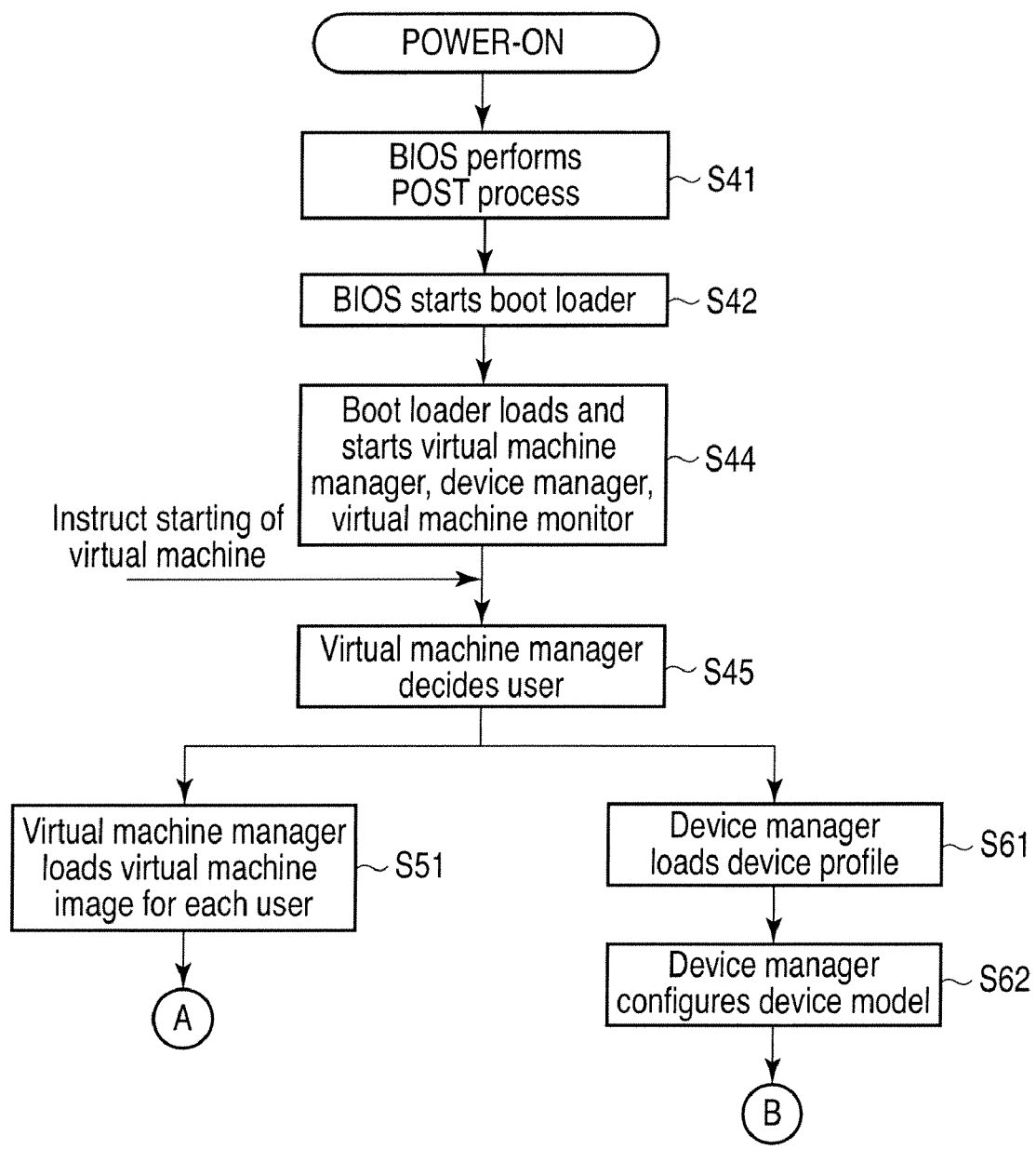
FIG. 9 is a flowchart for illustrating the operation flow from booting of the client computer to execution of the virtual machine.
Figure 10:
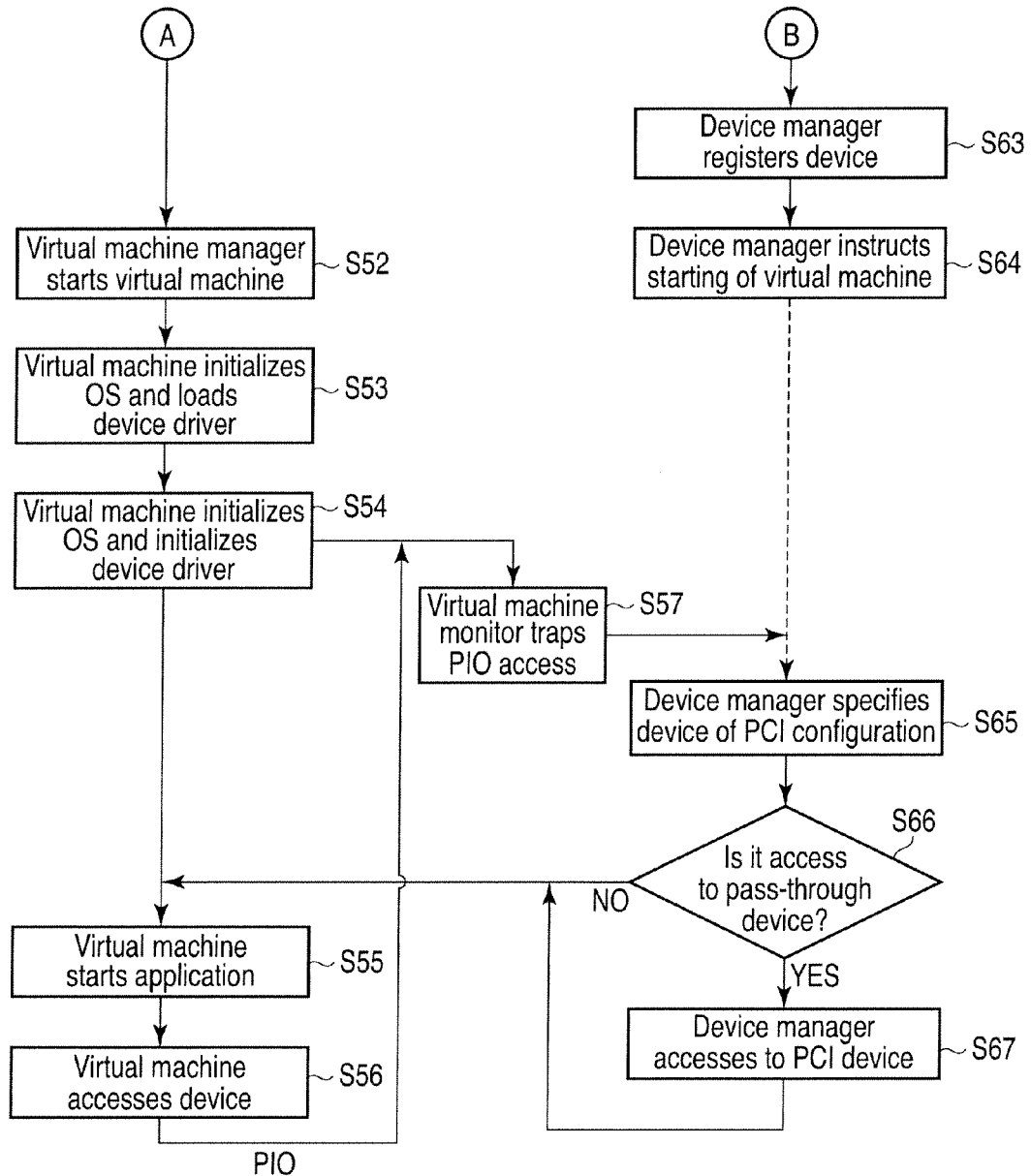
FIG. 10 is a flowchart for illustrating the operation flow from booting of the client computer to execution of the virtual machine.
Figure 11:
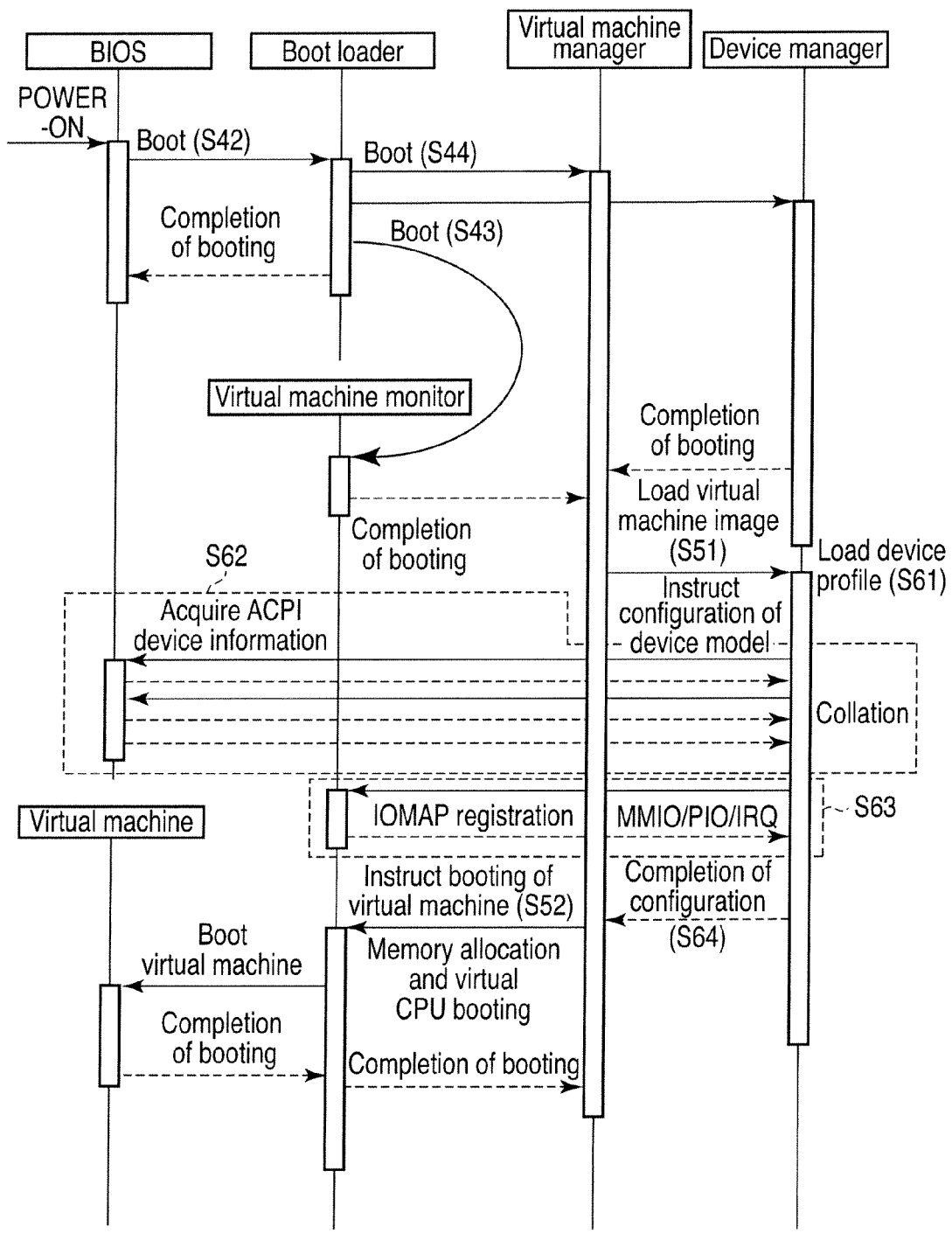
FIG. 11 is a flowchart for illustrating the operation flow from booting of the client computer to execution of the virtual machine.

FIG. 8 shows the configuration of the device manager that manages the H/W device and the relationship thereof with the virtual machine and virtual machine monitor.

FIGS. 9, 10, 11 and 12 show the operation flows from booting of the computer 10 (by turning ON the power source) to execution of the virtual machine.

If the user depresses the power button and a wakeup event occurs, the CPU 101 performs a POST (Power-On Self Test) process according to the BIOS installed on the BIOS-ROM 109 (block S41). After the POST process is terminated, a booted boot loader generally loads an OS, but in the PC, the boot loader loads and boots the virtual machine manager 210, device manager 220 and virtual machine monitor 230 (block S44).

In this case, if a boot instruction (that is the same as that of the normal OS) of the virtual machine is provided, the virtual machine manager 210 decides user information to be booted (block S45). If the user is decided based on the ID of the PC or user name previously set, the virtual machine manager 210 acquires an install image from the hard disk drive (block S51). In this case, all of them are not loaded and a loader, system file, driver and the like required for initially booting the virtual machine are loaded. At this time, the virtual machine manager instructs the device manager 220 to configure a device suitable for the user.

The device manager 220 loads a device profile 250 from user information (block S61) and configures a device model 211 corresponding to the device profile (block S62). One example of the device profile 250 is shown in FIG. 13. The configuration of the device model is formed by means of a device model creating portion 221 that acquires actual HW device information of the computer 10 from ACPI information of the BIOS and collates the same with profile information. For example, if it is described that a USB device is present in the ACPI information, whether a list in which Device Type is a USB is present in the profile information or not is checked. If the list is present, a device model configuration list of FIG. 14 is configured so that the virtual machine may use the USB device. If the same type of device is not present in the device profile although a device is present in the ACPI information, the device is not additionally provided in the device model configuration list. Further, if a device is provided in the device profile and is not present in the ACPI information, the same operation is performed. When confirmation of all of the devices is completed, a virtual device model as shown in FIG. 15 is configured. As shown in FIG. 15, a graphics processing unit 105V, USB controller 113V and PCI-PCI bridge 280 are connected to a host bridge 270 via a bus 0. An IEEE1394 controller 116V is connected to the PCI-PCI bridge 280 via a bus 1. An ISA bus is connected to the bus 1 via a PCI-PCI bridge 290. Further, a keyboard/mouse controller 117V is connected to the ISA bus.

When configuring the virtual device model shown in FIG. 15, the device manager 220 is configured to have the same configuration as a device (bus No., device ID, Function ID) of the real computer. If a device that is to be newly added thereto is present, a device ID is additionally provided with the device ID thereof being not duplicated with the other device ID and if a device to be concealed is present, the device is deleted. As a result, the device can be booted in a virtual environment without reconfiguring the driver and operating system of a pre-install image.

The device manager 220 registers a device to the virtual machine monitor 230 according to the device model configuration list shown in FIG. 14 (block S63). At the registration time, the device manager 220 informs the virtual machine monitor 230 of a PCI device BUS number, PCI device Device number, PCI device Function number, I/O port address (PIO and MMIO) to be used, IOMAP information of a virtual I/O port address (PIO and MMIO), interrupt number (IRQ) and virtual interrupt number (VIRQ).

Further, the device manager 220 adds information that sets an address space of an SMBIOS, extended BIOS and VIDEO BIOS on the virtual machine to coincide with addresses of an SMBIOS, extended BIOS and VIDEO BIOS allocated to a memory space of the real machine to the device model.

The SMBIOS is a copy of information obtained by storing information specific to the computer in a nonvolatile memory by the user, operating system, application and the like. The operating system, application and the like can utilize information stored in the SMBIOS. The SMBIOS is mapped in a range of C000h to FFFFH. The extended BIOS is a BIOS contained in the extended card inserted into a PCI slot or the like. At the boot time, the extended BIOS is mapped in a range of C000h to DFFFH. The VIDEO BIOS is a shadow mapped in a range of 0000h to DFFFh to make high-speed access to a Video Video BIOS provided on the extended card in which the GPU 105 is provided.

When registration is completed, the device manager 220 instructs the virtual machine manager 210 to boot the client virtual machine 200A (block S64). The virtual machine manager 210 boots a virtual machine downloaded from the server 240 according to the instruction (block S52). The thus booted client virtual machine 200A loads a device driver (block S53) and initializes the device driver (block S54) in the course of initialization at the booting time of the operating system (OS). Then, after booting the operating system, an application is booted in the virtual machine (block S55). At the initialization time of the device driver or if PIO access is made from the application, the virtual machine monitor traps the access (block S57).

The virtual machine monitor 230 traps access (block S57) if interruption or access to the port I/O or access to the PCI configuration space occurs from the client virtual machine 200A to the PCI device by registration of the IOMAP, and the address is changed to a registration address to make access.

In the case of access to the PCI configuration space among the accesses to the I/O port, the virtual machine monitor 230 calls the device manager 220 and the device manager 220 acts as an agent to make access to the PCI configuration space. In a case wherein the device manager acts as an accessing agent, two accessing methods are provided. Therefore, the device manager specifies a device that accesses the PCI configuration (block S65). Then, the specified device determines whether access to a pass-through device is made or not (block S66). If it is determined that the access is made to the pass-through device (YES in block S66), access is made to the configuration space of a real PCI device (block S67). Further, if it is determined that the access is not access to the pass-through device (NO in block S66), a device that has a dummy area obtained by copying the configuration space and provided in the device manager 220 and is not required to be directly accessed, or a device commonly used by other virtual machines performs a read/write operation with respect to the dummy area.

In the case of MMIO and DMA transfer, an address conversion unit 260 converts an address from a virtual physical address to a machine address to access according to address conversion information in response to a request from the virtual machine. The address conversion unit 260 is provided in a device in which the memory controller is provided. The address conversion unit 260 comprises an I/O memory management unit (IOMMU) 261 and DMARU (DMA Remapping Unit) 262. The I/O memory management unit (IOMMU) 261 is used when the client virtual machine 200A accesses an MMIO area on the main memory. In this case, since the condition as viewed from the virtual machine side is the same as that in which a normal device is used, the device can be used from the virtual machine by directly using the device driver of the virtual machine.

Figure 16:
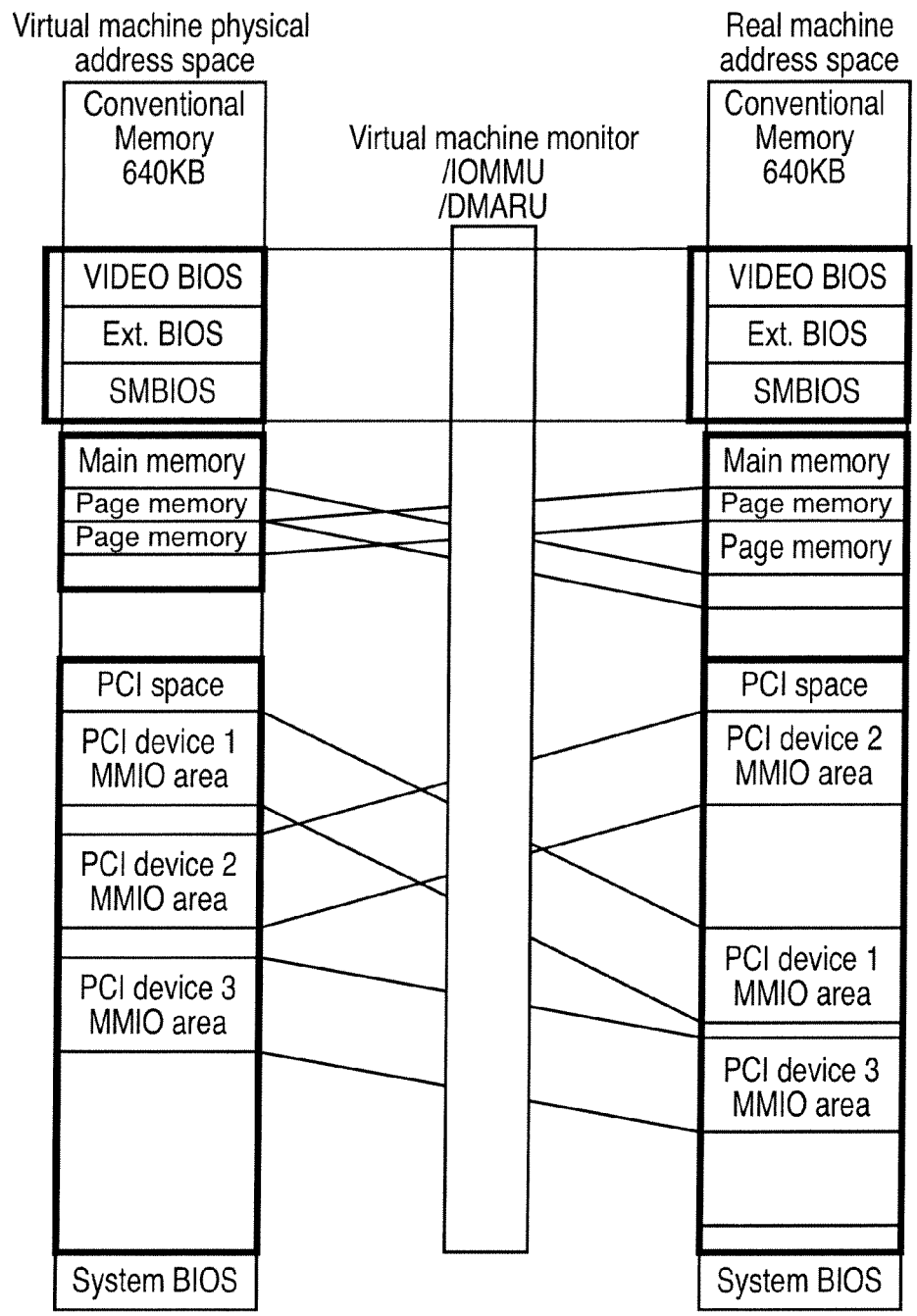
FIG. 16 is a diagram showing an example of conversion of address spaces.

Further, the DMARU 262 is used when DMA transfer is made with respect to the memory space allocated to the client virtual machine 200A. FIG. 16 shows the state of address conversion. As shown in FIG. 16, conversion between MMIO areas of a PCI device 1, PCI device 2 and PCI device 3 and the page memory on the physical address space of the virtual machine and MMIO areas of the PCI device 1, PCI device 2 and PCI device 3 and the page memory on the address space of the real machine is performed by means of the virtual machine monitor, I/O memory management unit (IOMMU) 261 and DMARU (DMA Remapping Unit) 262.

As shown in FIG. 16, the SMBIOS, extended BIOS (Ext. BIOS) and VIDEO BIOS on the physical address space of the virtual machine and the SMBIOS, extended BIOS (Ext. BIOS) and VIDEO BIOS on the physical address space of the real machine are equivalently mapped in addresses in one-to-one correspondence via the address conversion unit 260.

In the standard architecture of an IBM PC, segments 000h to 9FFFh are designed as a reservation area of a RAM, A000h to BFFFH are designed as a reservation area of a video memory or video BIOS, and C000h to FFFH are designed as a reservation area of an extended BIOS or the like.

Areas of the above SMBIOS, extended BIOS and VIDEO BIOS used by an application or operating system are mapped at the installation time thereof. Therefore, if the addresses of the SMBIOS, extended BIOS and VIDEO BIOS are different in the address space on the virtual machine and in the address space on the real machine, the application or operating system cannot access the SMBIOS, extended BIOS or VIDEO BIOS.

As described above, the same content as that of the real machine can be processed by referring to the content from the virtual machine if addresses in the address space on the real machine and in the address space on the virtual machine are equivalently mapped.

Figure 17:
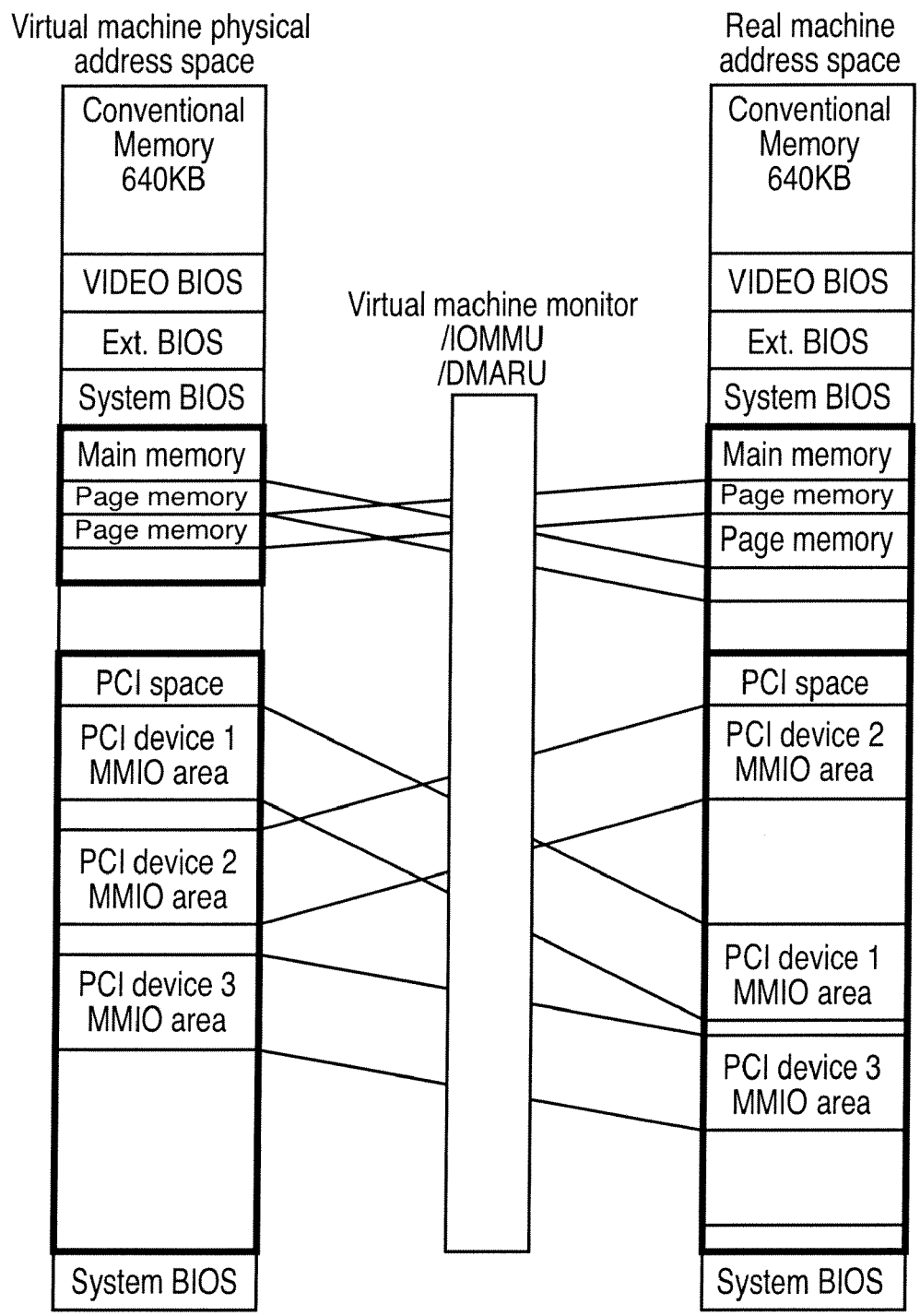
FIG. 17 is a diagram showing an example of conversion of address spaces.

As shown in FIG. 17, the SMBIOS, extended BIOS (Ext. BIOS) and VIDEO BIOS on the physical address space of the virtual machine and the SMBIOS, extended BIOS (Ext. BIOS) and VIDEO BIOS on the physical address space of the real machine may not be equivalently mapped in addresses in one-to-one correspondence via the address conversion unit 260. In the conversion example shown in FIG. 17, addresses to which the SMBIOS, extended BIOS and VIDEO BIOS are allocated may be different from each other for each computer and it becomes impossible to boot the system by using an image created by a different computer in some cases.

Further, if access is made to the device when a probe (search) process is performed for the PCI or legacy device at the boot time, the virtual machine accesses the device of the virtual device model of FIG. 15 instead of the device of the real machine and the virtual machine with the device configuration of the model is booted.

The operability and the I/O performance of the virtual machine can be markedly enhanced by allocating a device capable of directly mapping addresses on the virtual machine by means of the virtual machine monitor and device manager to the computer 10 side and performing address conversion between the real memory space and the memory space in the virtual machine by hardware. As a result, the high-speed drawing operation by using CAD or application dealing with multimedia can be performed.

Further, I/O emulation of the virtual machine can be obviated, making it possible to use a device that cannot be used because emulation does not correspond thereto, for example, from the virtual machine by directly utilizing the device driver of the virtual machine.

Since a usable I/O device can be specified by preparing a device profile for each user, and I/O devices that can be recognized from an OS (virtual machine) are limited, it becomes impossible to make a device valid even if the user installs a device driver and intentionally makes the device valid, thus a security measure useful for preventing information leakage or the like can be taken.

An environment for each user can be set and used without performing installing and resetting operations even when H/W of the computer is changed by loading and booting an image of the virtual machine by means of a different server.

This invention is not limited to the above embodiment as it is and can be embodied by modifying the constituents without departing from the scope in the embodying stage. Further, various inventions can be made by adequately combining a plurality of constituents disclosed in the above embodiment. For example, several constituents may be omitted from all of the constituents disclosed in the above embodiment. In addition, the constituents disclosed in different embodiments may be adequately combined.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A computer machine comprising:
a local disk;
a memory;
a virtual machine monitor configured to run in the computer machine;
virtual machines configured to run on the virtual machine monitor wherein the virtual machines comprises a client virtual machine and a file server virtual machine in which an internal file server accessible from the client virtual machine is executed;
a virtual machine manager configured to manage a part of the local disk and a part of the memory and to control booting of the virtual machines;
a monitoring module configured to monitor whether a communication with an external server in which an external file server is executed via a network is possible;
an access control module configured to access a file in the external file server or the internal file server from the client virtual machine, wherein the monitoring module determines that the communication with the external server from the client virtual machine is impossible the access control module further configured to write-access a file in the part of the local disk or in the part of the memory, which are managed by the virtual machine manager, when the monitoring module determines that the communication with the external server is impossible during a first time period after determining that the communication with the external server via the network is possible, wherein the communication with the external server is determined to be impossible when a response is not issued from the external server;
a file deletion module configured to delete the write-accessed file in the part of the local disk or in the part of the memory when the monitoring module determines that the communication with the external server is impossible during a second time period, which is longer than the first time period, after determining that the communication with the external server via the network is possible and;
wherein the monitoring module further configured to instruct the virtual machine manager to perform a forced termination or a suspend of the client virtual machine when the monitoring module detects that the communication is impossible, and
the virtual machine manager further configured to perform the forced termination or the suspend of the client virtual machine according to an instruction from the monitoring module.

2. The computer machine of claim 1, further comprising an encryption module configured to encrypt the write-accessed file in the part of the local disk or the part of the memory.

3. The computer machine of claim 1, further comprising:
- a device manager configured to create a device model comprising information to allocate an I/O device of the computer machine to the client virtual machine according to a device profile and the I/O device; and
- a memory controller comprising an address conversion circuit configured to perform an address conversion for performing a MMIO access from the client virtual machine to the I/O device and an address conversion for performing a DMA transfer between the I/O device and the client virtual machine,
- wherein the client virtual machine is configured to allocate the I/O device to the client virtual machine based on the device model, and
- the client virtual machine is configured to perform the access or the DMA transfer using the address conversion circuit according to the device model.

4. The computer machine of claim 3, further comprising an allocating module configured to allocate the I/O device of the computer machine and another BIOS (Basic Input/Output System) different from a system BIOS to a memory space,
- wherein the device manager is configured to create a device model comprising information for allocating an address of the another BIOS on an address space of the client virtual machine to a same address as allocated by the allocating module, and
- the client virtual machine is configured to make an access by using the address conversion circuit when making the access to the another BIOS.

5. An access control method of a computer machine comprising a local disk, a memory, virtual machines which run on a virtual machine monitor, the method comprising:
- managing a part of the local disk and a part of the memory and controlling booting of the virtual machines by a virtual machine manager, wherein one of the virtual machines being a client virtual machine and another one of the virtual machines being a file server virtual machine on which an internal file server accessible from the client virtual machine is executed;
- monitoring whether a communication with an external server on which an external file server is executed via a network is possible;
- accessing a file in the external server or the internal file server from the client virtual machine when it is determined that the communication is possible;
- write-accessing a file in the part of local the local disk or the part of the memory, which are managed by the virtual machine manager, from the client virtual machine when it is determined from the monitoring that the communication with the external server is impossible during a first time period after it is determined from the monitoring that the communication with the external server via the network is possible, wherein the communication with the external server is determined to be impossible when a response is not issued from the external server; and
- deleting the write-accessed file in the part of the local disk or the part of the memory when it is determined from the monitoring that the communication is impossible during a second time period, which is longer than the first time period, after it is determined that the communication with the external server via the network is possible; and
- instructing the virtual machine manager to perform a forced termination or a suspend of the client virtual machine when the monitoring detects that the communication is impossible, and
- performing the forced termination or the suspend of the client virtual machine according to the instructing.

* * * * *